(12) United States Patent
Yang

(10) Patent No.: US 12,058,432 B2
(45) Date of Patent: Aug. 6, 2024

(54) ELECTRONIC DEVICE

(71) Applicant: GUANGDONG OPPO MOBILE TELECOMMUNICATIONS CORP., LTD., Guangdong (CN)

(72) Inventor: Xiaowei Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 112 days.

(21) Appl. No.: 17/937,959

(22) Filed: Oct. 4, 2022

(65) Prior Publication Data

US 2023/0028213 A1 Jan. 26, 2023

Related U.S. Application Data

(63) Continuation of application No. PCT/CN2021/077675, filed on Feb. 24, 2021.

(30) Foreign Application Priority Data

Apr. 30, 2020 (CN) .......................... 202010366199.5

(51) Int. Cl.
*H04N 23/57* (2023.01)
*G02B 7/02* (2021.01)
(Continued)

(52) U.S. Cl.
CPC ............. *H04N 23/57* (2023.01); *G02B 7/021* (2013.01); *G03B 17/04* (2013.01); *G03B 17/17* (2013.01);
(Continued)

(58) Field of Classification Search
CPC ........ H04N 23/55; H04N 23/57; H04N 23/58; H04N 23/667; H04M 1/0237;
(Continued)

(56) References Cited

U.S. PATENT DOCUMENTS 8,369,023 B2 2/2013 Choi
10,448,521 B2 * 10/2019 Seo .......................... H05K 1/189
(Continued)

FOREIGN PATENT DOCUMENTS

CN          1837880      9/2006
CN          101013191    8/2007
(Continued)

OTHER PUBLICATIONS

EPO, Extended European Search Report for EP Application No. 21796168.9, Sep. 22, 2023.
(Continued)

*Primary Examiner* — Lin Ye
*Assistant Examiner* — Chriss S Yoder, III
(74) *Attorney, Agent, or Firm* — Hodgson Russ LLP

(57) ABSTRACT

An electronic device includes a housing, a display screen and a camera module. The display screen is combined with the housing and capable of being drawn into or out of the housing. The camera module includes a reflective element, a first lens component, a second component and an image sensor. The image sensor is configured to image based on light reflected by the reflective element to travel through the first lens component when the camera module is working in a first mode. The image sensor is configured to image based on light reflected by the reflective element to travel through the first lens component and the second lens component when the camera module is working in a second mode.

20 Claims, 12 Drawing Sheets

(51) Int. Cl.
    *G03B 17/04*     (2021.01)
    *G03B 17/17*     (2021.01)
    *G06F 1/16*     (2006.01)
    *H04N 23/667*     (2023.01)

(52) U.S. Cl.
    CPC ......... *G06F 1/1637* (2013.01); *H04N 23/667* (2023.01)

(58) Field of Classification Search
    CPC .. H04M 1/0264; H04M 1/0268; G02B 7/021; G02B 7/04; G03B 5/00; G03B 13/32; G03B 17/04; G03B 17/17; G03B 2205/0046; G06F 1/1624; G06F 1/1637; G06F 1/1652; G06F 1/1686
    See application file for complete search history.

(56) References Cited

U.S. PATENT DOCUMENTS

| | | | |
|---|---|---|---|
| 11,416,036 B2 * | 8/2022 | Yin .................. | G06F 1/1652 |
| 2006/0098306 A1 | 5/2006 | Yoshitsugu et al. | |
| 2008/0088942 A1 | 4/2008 | Seo | |
| 2008/0151396 A1 | 6/2008 | Chiang | |
| 2011/0080650 A1 | 4/2011 | Nanba | |
| 2016/0373654 A1 | 12/2016 | Kwon et al. | |

FOREIGN PATENT DOCUMENTS

| | | |
|---|---|---|
| CN | 101256345 | 9/2008 |
| CN | 101750723 | 6/2010 |
| CN | 102269857 | 12/2011 |
| CN | 203759584 | 8/2014 |
| CN | 104536531 | 4/2015 |
| CN | 104933964 | 9/2015 |
| CN | 106713538 | 5/2017 |
| CN | 108766235 | 11/2018 |
| CN | 208190708 | 12/2018 |
| CN | 109407290 | 3/2019 |
| CN | 208739253 | 4/2019 |
| CN | 109995917 | 7/2019 |
| CN | 110198407 | 9/2019 |
| CN | 110428732 | 11/2019 |
| CN | 110445918 | 11/2019 |
| CN | 110493398 | 11/2019 |
| CN | 110971725 | 4/2020 |
| CN | 111474809 | 7/2020 |
| CN | 111538145 | 8/2020 |
| CN | 111641743 | 9/2020 |
| CN | 111988527 | 11/2020 |
| KR | 20190004618 | 1/2019 |

OTHER PUBLICATIONS

WIPO, International Search Report and Written Opinion for PCT/CN2021/077675, Apr. 30, 2021.
CNIPA, First Office Action for CN Application No. 202010366199.5, Apr. 27, 2021.
CNIPA, Notification to Grant Patent Right for Invention for CN Application No. 202010366199.5, Jul. 16, 2021.

* cited by examiner

ELECTRONIC DEVICE

CROSS-REFERENCE TO RELATED APPLICATIONS

This application is a continuation of International Application PCT/CN2021/077675, filed Feb. 24, 2021, which claims priority to Chinese Patent Application No. 202010366199.5, filed Apr. 30, 2020, the entire disclosures of which are incorporated herein by reference.

TECHNICAL FIELD

The disclosure relates to technical field of imaging technologies, and more particularly to an electronic device.

BACKGROUND

An electronic device such as a mobile phone generally supports functions of video viewing, games, entertainment or office, and the electronic device such as the mobile phone is generally provided with an optical lens for capturing images.

SUMMARY

Embodiments of the disclosure provide an electronic device.

The disclosure provides an electronic device. The electronic device includes a housing, a display screen combined with the housing and capable of being drawn into or out of the housing, and a camera module accommodated in the housing. The camera module includes a reflective element, a first lens component, a second lens component, and an image sensor. The image sensor is configured to image based on light reflected by the reflective element to travel through the first lens component when the camera module is working in a first mode. The image sensor is configured to image based on light reflected by the reflective element to travel through the first lens component and the second lens component when the camera module is working in a second mode.

For additional aspects and advantages of embodiments of the present disclosure, some of them are provided in the descriptions as follows, and some of them become apparent from the descriptions as follows, or may be understood through practice of the disclosure.

BRIEF DESCRIPTION OF THE DRAWINGS

The above and/or additional aspects and advantages of the disclosure will become apparent and more readily appreciated from the following descriptions of the embodiments in conjunction with the drawings.

DETAILED DESCRIPTION OF PREFERRED EMBODIMENTS

Figure 1:
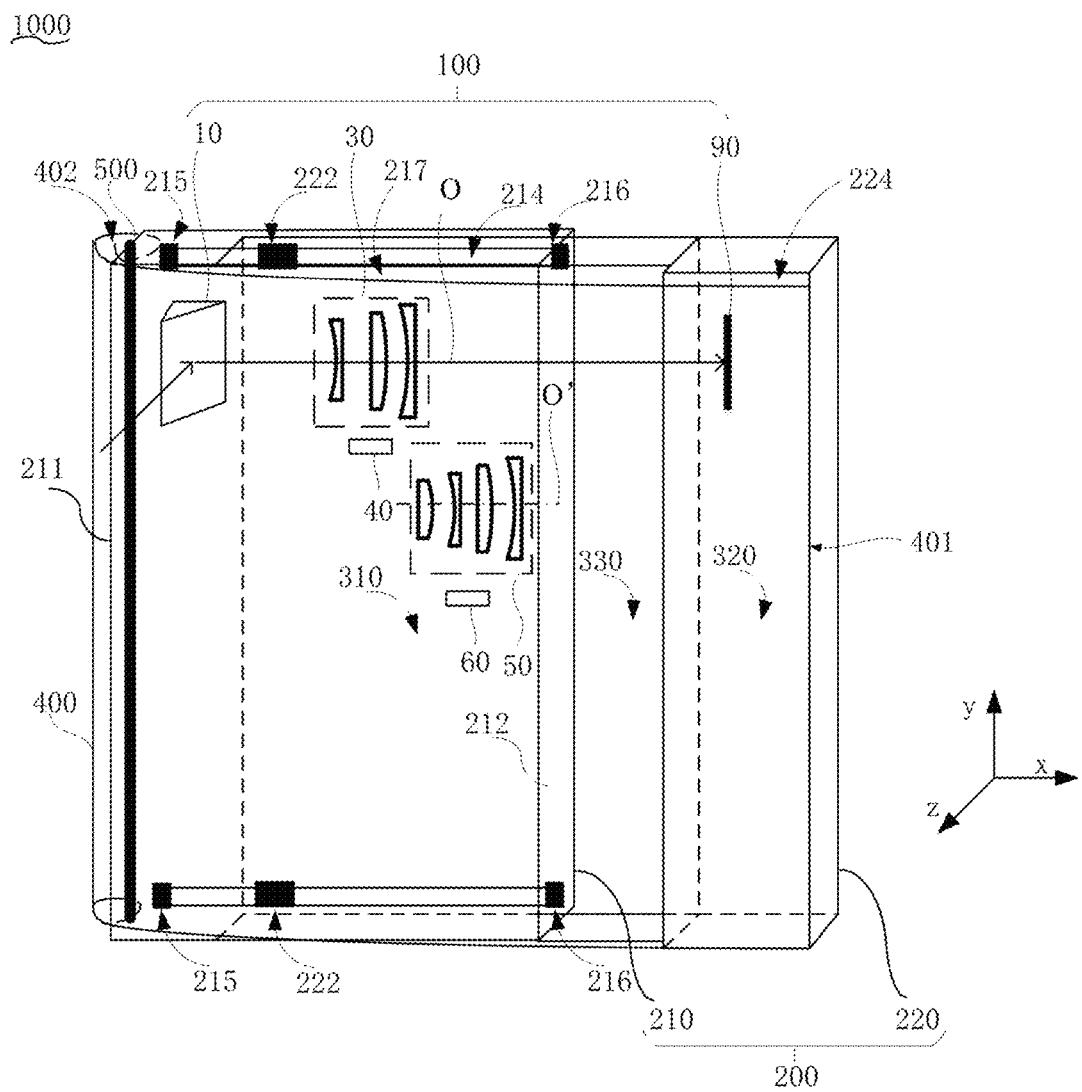
FIG. 1 is a schematic structural diagram illustrating an electronic device according to some embodiments of the disclosure.

Hereinafter, the embodiments of the disclosure are described in detail. Examples of the embodiments are shown in the drawings, where the same or similar reference signs represent the same or similar elements or elements having the same or similar functions. The embodiments described hereinafter with reference to the drawings are exemplary, which are only intended to explain the disclosure and should not be construed as limitation to the disclosure.

Referring to FIG. 1, in the embodiments of the disclosure, the electronic device 1000 includes a housing 200, a display screen 400 which is combined with the housing 200 and may be drawn into or out of the housing, and a camera module 100 accommodated in the housing 200. The camera module 100 includes a reflective element 10, a first lens component 30, a second lens component 50, and an image sensor 90. When the camera module 100 is working in a first mode, light is reflected by the reflective element 10 to travel through the first lens component 30 to thereby reach the image sensor 90 for imaging; when the camera module 100 is working in a second mode, light is reflected by the reflective element 10 to travel through the first lens component 30 and the second lens component 50 to thereby reach the image sensor 90 for imaging.

In some embodiments, the display screen 400 is capable of being switched between an expanded state and an accommodated state, and the camera module 100 corresponds to the first mode when the display screen 400 is in the accommodated state; the camera module 100 corresponds to the second mode when the display screen 400 is in the expanded state.

In some embodiments, the first mode includes a short focal length mode, and the second mode includes a long focal length mode.

In some embodiments, the first lens component 30 has a first optical axis, and the second lens component 50 has a second optical axis; when the display screen 400 is in the accommodated state, the first optical axis is not coincident with the second optical axis, and the second lens component 50 is located outside an optical path between the first lens component 30 and the image sensor 90; when the display screen 400 is in the expanded state, the first optical axis is coincident with the second optical axis.

In some embodiments, the first optical axis is consistent with a direction in which the display screen 400 is drawn into or out of the housing.

In some embodiments, there is a first distance between the first lens component 30 and the image sensor 90 when the display screen 400 is in the accommodated state, there is a second distance between the first lens component 30 and the image sensor 90 when the display screen 400 is in the expanded state, and the second distance is greater than the first distance.

In some embodiments, when the display screen 400 is in a partially expanded state, a distance between the first lens component 30 and the image sensor 90 is greater than the first distance, and the image sensor 90 is configured to image based on light reflected by the reflective element 10 to travel through the first lens component 30.

In some embodiments, during a transformation of the display screen 400 from the accommodated state to the expanded state, the image sensor 90 is configured to move synchronously with the display screen 400 being drawn out of the housing.

In some embodiments, the second lens component 50 is configured to move towards a position between the first lens component 30 and the image sensor 90, in response to a distance between the first lens component 30 and the image sensor 90 being greater than a preset threshold.

Alternatively, the second lens component 50 is configured to move towards a position between the first lens component 30 and the image sensor 90, in response to the display screen 400 being drawn out of the housing.

Figure 7:
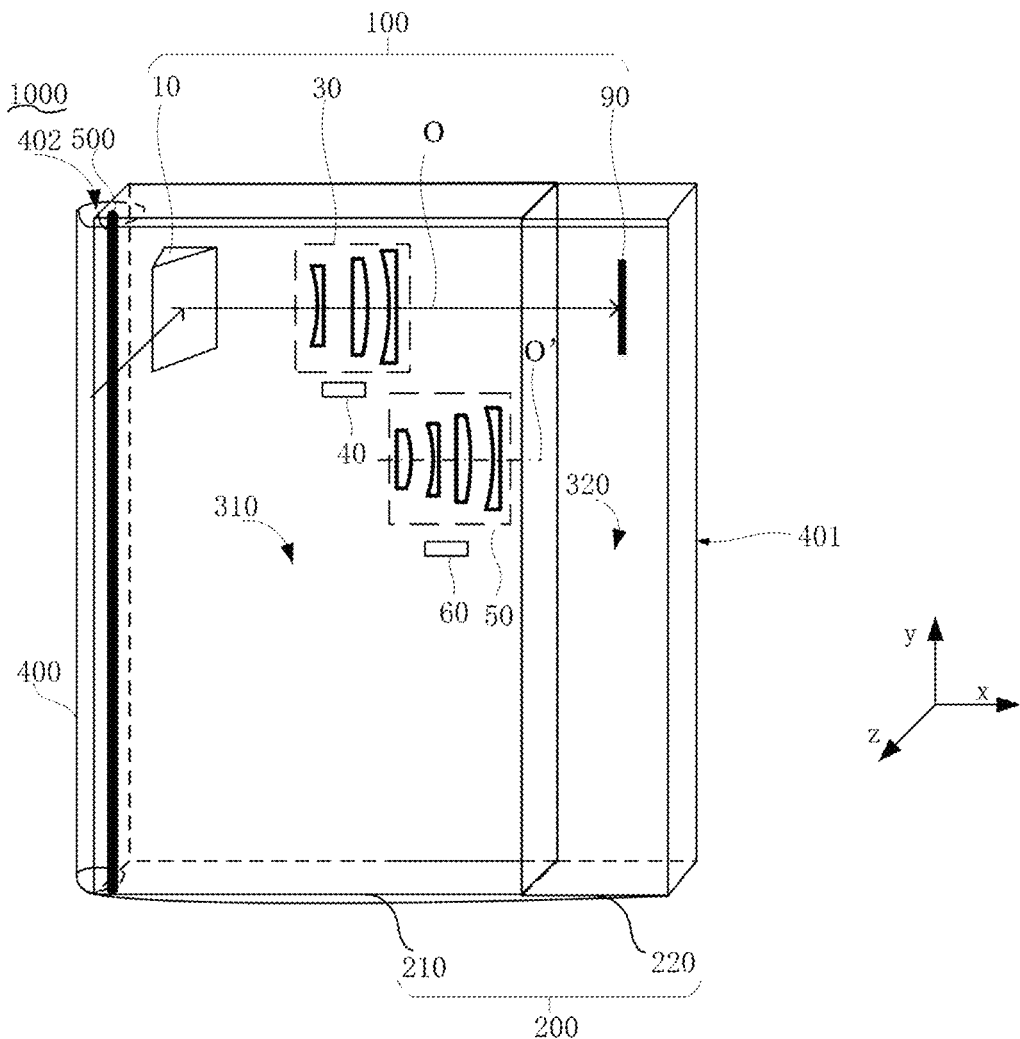
FIG. 7 is a schematic structural diagram illustrating the electronic device in an accommodated state according to the still another embodiment of the disclosure.

Referring to FIG. 7, in some embodiments, the electronic device 1000 further includes a first focal length adjusting component 40 and a second focal length adjusting component 60. The first focal length adjusting component 40 is connected with the first lens component 30, and the first focal length adjusting component 40 is configured to adjust a focal length of the first lens component 30 to thereby enable the light traveling through the first lens component 30 to be focused on the image sensor 90 in the first mode; or/and the second focal length adjusting component 60 is connected with the second lens component 50, and the second focal length adjusting component 60 is configured to adjust a focal length of the second lens component 50 to thereby enable the light traveling through the first lens component 30 and the second lens component 50 to be focused on the image sensor 90 in the second mode.

Referring to FIG. 1, in some embodiments, the electronic device 1000 includes a first housing 210 and a second housing 220, a reel 500 is provided on a first side 211 of the first housing 210, the second housing 220 is connected with a second side 212 of the first housing 210 into which the second housing 220 is relatively movably inserted, the first side 211 is opposite to the second side 212, a first end of the display screen 400 is fixedly connected to an upper surface 224 (i.e., front surface) of the second housing 220, a second end of the display screen 400 is wound around the reel 500, and the display screen 400 is movable along an upper surface 217 (i.e., front surface) of the first housing 210 under driving of a movement of the second housing 220. The first housing 210 and the second housing 220 are configured to move relative to each other.

In some embodiments, the image sensor 90 is accommodated in the second housing 220 and fixed relative to the second housing 220, the image sensor 90 is configured to move synchronously with the display screen 400 being drawn into or out of the housing, and the first lens component 30 and the reflective element 10 are disposed in the first housing 210 and fixed relative to the first housing 210.

In some embodiments, the camera module 100 is disposed below the display screen 400, and a light entrance of the camera module 100 is arranged to face the display screen 400 or face away from the display screen 400.

In some embodiments, the first lens component 30 includes one or more lens groups, the second lens component 50 includes one or more lens groups, and each lens group of the one or more lens groups comprises one or more lenses.

In some embodiments, the second lens component 50 includes multiple lens groups, and the multiple lens groups are capable of moving to a position between the first lens component 30 and the image sensor 90 asynchronously or simultaneously.

In some embodiments, the display screen 400 is a flexible display screen.

In some embodiments, the electronic device 100 includes a first housing 210 and a second housing 220, the first housing 210 defines a first accommodation cavity 310 therein, the second housing 220 defines a second accommodation cavity 320 therein, both of a top and a bottom of the first accommodation cavity 310 are provided with guide rails 214 respectively, each of the guide rails 214 is mounted on an inner side of the first accommodation cavity 310 and disposed between the first housing 210 and the second housing 220, both of a top and a bottom of the second housing are provided with sliding blocks 222 respectively, the sliding block 222 at the top of the second housing 220 is configured to cooperate with the guide rail 214 at the top of the first accommodation cavity 310, the sliding block 222 at the bottom of the second housing 220 is configured to cooperate with the guide rail at the bottom of the first accommodation cavity 310, thereby enabling each of the sliding blocks 222 to move along the corresponding guide rail 214 to drive the second housing 220 to move away from or approach the first housing 210.

In some embodiments, a first limiting component 215 is provided at a starting position of each of the guide rails 214, and a second limiting component 216 is provided at an end position of each of the guide rails 214.

In some embodiments, the image sensor 90 is disposed in the first housing 210, the first lens component 30 and the reflective element 10 are accommodated in the second housing 220 and fixed relative to the second housing 220, and the first lens component 30 and the reflective element 10 are configured to move synchronously with the display screen 400 being drawn into or out of the housing 200.

In some embodiments, the first focal length adjusting component 40 and the second focal length adjusting component 60 are implemented as electrostatic actuator components, electromagnetic actuator components, magnetostrictive actuator components, piezoelectric actuator components, piezoelectric motors, stepping motors, or electroactive polymer actuator motors.

Referring to FIG. 1, the disclosure provides the electronic device 1000. The electronic device 1000 includes the housing 200, the display screen 400 which is combined with the housing 200 and may be drawn into or out of the housing 200, and the camera module 100 accommodated in the housing 200. The camera module 100 includes the reflective element 10, the first lens component 30, the second lens component 50, and the image sensor 90. The image sensor 90 is configured to image based on light reflected by the reflective element 10 to travel through the first lens component 30 when the camera module 100 is working in the first mode. The image sensor 90 is configured to image based on light reflected by the reflective element 10 to travel through the first lens component 30 and the second lens component 50 when the camera module 100 is working in the second mode.

The electronic device such as the mobile phone with a small display screen has limitations for watching movies, games, entertainment or office, and user experience is poor in some application scenarios requiring a large interactive screen, such as movie watching and game interaction. In addition, the electronic device such as the mobile phone is generally equipped with an optical lens for taking pictures. The optical lens is usually long in length to achieve desirable imaging performance, which limits the arrangement of components on the mainboard to a certain extent, making the electronic device to be bulky and not portable.

In the embodiments of the disclosure, the electronic device 1000 is configured with the display screen 500 that is combined with the housing 200 and may be drawn into or out of the housing 200, and the camera module 100 accommodated in the housing 200, so as to enable a user to switch, according to the usage scenario, a state of the display screen 400 when using the electronic device 1000. In addition, the camera module 100 is configured with the reflective element 10 and the lens components which may be optionally adjusted to a first operation mode or a second operation mode, so that the electronic device 1000 may be optionally equipped with a large area display screen 400 in the expanded state and a small area display screen 400 with a short lateral length in the accommodated state. In this way, the electronic device 1000 can be used in various application scenarios, so as to meet diversified usage requirements of the user proposed on the electronic device 1000 while enabling the electronic device 1000 with a short lateral length in the first operation mode, thereby facilitating the miniaturization of the electronic device 1000 in the accommodated state and enabling the electronic device 1000 of the disclosure to be portable.

Specifically, the housing 200 may include the first housing 210 and the second housing 220. As illustrated in FIG. 1, the reel 500 is disposed on the first side 211 of the first housing 210, the second housing 220 is connected with the second side 212 of the first housing 210 into which the second housing 220 is relatively movably inserted, the first side 211 is opposite to the second side 212, the first end of the display screen 400 is fixedly connected to the upper surface 224 of the second housing 220, the second end of the display screen 400 is wound around the reel 500, and the display screen 400 is movable along the upper surface 217 of the first housing 210 under driving of the movement of the second housing 220. Hereinafter, the upper surface 224 of the second housing 220 and the upper surface 217 of the first housing 210 refer to a front surface of the electronic device 1000, i.e., a surface facing z direction in FIG. 1. In the embodiments of the disclosure, the electronic device 1000 may be configured to control the second housing 220 to approach or move away from the first housing 210 to thereby drive the display screen 400 to move along the upper surface 217 of the first housing 210, so as to enable the display screen 400 to be expanded (i.e., unfolded) or folded, that is, a function of drawing the display screen 400 out of or into the housing 200 is achieved. Specifically, the display screen 400 gradually expanded out of the reel 500 as the second housing 220 moves away from the first housing 210, and the display screen 400 is gradually accommodated into the reel 500 as the second housing 220 moves towards the first housing 210.

The display screen 400 may be a flexible display screen 400, which may include a flexible organic light emitting diode (OLED) panel and a plastic substrate, so that the flexible display screen 400 may be accommodated in the housing 200 and wound around the reel 500 to present three different states including the accommodated state, the expanded state, and the partially expanded state. Correspondingly, cooperation states of the first housing 210 and the second housing 220 also includes three states including an accommodated state, an expanded state, and a partially expanded state. The display screen 400 may be drawn into or out of the housing 200, that is, the display screen 400 may be switched from the three different states, i.e., the accommodated state, the expanded state, and the partially expanded state.

When the display screen 400 is in the accommodated state, a portion of the display screen 400 which is capable of being accommodated is completely wound around the reel 500. When the display screen 400 is in the partially expanded state, i.e., a partially accommodated state, a part of the portion of the display screen 400 which is capable of being accommodated is wound around the reel 500, and the other part of the portion of the display screen 400 is released from the reel 500 to be located outside the housing 200. When the display screen 400 is in the expanded state, portion of the display screen 400 which is capable of being wound around the reel 500 is completely expanded out of the housing 200. According to the embodiments of the disclosure, the display screen 400 has three different states, i.e., the accommodated state, the expanded state, and the partially expanded state, which is facilitated to enable the electronic device 1000 to be switched between the expanded state where the display screen 400 has the large area, the accommodated state where the display screen 400 has the small area and the short lateral length, and the partially expanded state where the area of the display screen 400 is greater than that of the accommodated state while less than that of the expanded state. In this way, the display screen 400 may be in different states according to different usage scenarios, so as to meet the diversified usage requirements of the user proposed on the electronic device 1000, and improve the user experience. When the display screen 400 is accommodated in the housing 200, the electronic device is as portable as a conventional cell phone. When the display screen 400 is partially or completely expanded, the electronic device 1000 is enabled with both entertainment and office functions, which is similar to the tablet computer, so as to cater to a current consumer demand for both of portability and multi-function.

Referring to FIG. 1, the first accommodation cavity 310 is formed inside the first housing 210, and the second accommodation cavity 310 is formed inside the second housing 210. When the second housing 220 moves away from the first housing 210 since the accommodated state, a space between the first accommodation cavity 310 and the second accommodation cavity 320 forms a third accommodation cavity 330. A right side of the first accommodation cavity 310 is open, a left side of the second accommodation cavity 320 is open, and a left side and a right side of the third accommodation cavity 330 are both open. In other words, the first accommodation cavity 310 is communicated with the third accommodation cavity 330 through the right side of the first accommodation cavity 310 and the left side of the third accommodation cavity 330, the second accommodation cavity 320 is communicated with the third accommodadation cavity 330 through the right side of the third accommodation cavity 330 and the left side of the second accommodation cavity 320. The guide rails 214 are arranged at both of the top and the bottom of the first accommodation cavity 310, respectively. Specifically, the guide rails 214 are mounted on the inner side of the first accommodation cavity 310 and arranged between the first housing 210 and the second housing 220. The sliding blocks 222 are arranged at both of the top and the bottom of the second housing, respectively. The sliding block 222 at the top of the second housing 220 is configured to cooperate with the guide rail 214 at the top of the first accommodation cavity 310, and the sliding block 222 at the bottom of the second housing 220 is configured to cooperate with the guide rail at the bottom of the first accommodation cavity 310. In this way, each of the sliding blocks 222 is movable on the corresponding guide rail 214 along the x direction or along the direction opposite to the x direction, so as to drive the second housing 220 to move away from or move towards the first housing 210. The first limiting component 215 is disposed at the starting position of each of the guide rails 214, and the second limiting component 216 is disposed at the end position of each of the guide rails 214. The starting position and the ending position of each of the guide rails 214 may be located at two ends of the guide rail 214. In some embodiments of the disclosure, the guide rails 214 and the sliding blocks 222 are arranged on the housing 200, so that the sliding blocks 222 may be moved relative to the guide rails 214 thereby enabling the first housing 210 and the second housing 220 to be moved relative to each other. In addition, the limiting components are arranged on the guide rails 214 to limit the positions of the sliding blocks 222, and the sliding blocks 222 may be fixed relative to the respective limiting components when the sliding blocks are not subject to an external force. In this way, when no external force is applied, the second housing 220 and the first housing 210 may be limited to be relatively fixedly disposed at positions of the accommodated state or positions of the expanded state, so as to enable the display screen 400 to be stably fixed in the accommodated state or the expanded state correspondingly. Further, in some other embodiments, the limiting components may be mounted on the guide rails 214 at positions other than the starting position and the ending position, so that the second housing 220 and the first housing 210 may be limited to be relatively fixed disposed at particular positions, so as to enable the display screen 400 to be stably fixed at a particular position.

When the cooperation state of the first housing 210 and the second housing 220 is the accommodated state, the second side 212 of the first housing 210 and a left edge of the second housing 220 fit together, i.e., the second side 212 of the first housing 210 is in contact with the left edge of the second housing 220, the second housing 220 cannot move towards the first housing 210 any more, while a volume of the third accommodation cavity 330 is zero. When the cooperation state of the first housing 210 and the second housing 220 is the partially expanded state, there is a distance between the second side 212 of the first housing 210 and the left side of the second housing 220, while a volume of the third accommodation cavity 330 is greater than zero. When the cooperation state of the first housing 210 and the second housing 220 is the expanded state, the distance between the second side 212 of the first housing 210 and the left edge of the second housing 220 reaches the maximum distance in the process of drawing out the display screen 400, while a volume of the third accommodation cavity 330 reaches the maximum in the stretching process of the display screen 400.

When the display screen 400 is in the accommodated state, the cooperation state of the first housing 210 and the second housing 220 is the corresponding accommodated state, that is, the sliding blocks 222 at the top and bottom of the first housing cavity 310 are respectively snapped into the first limiting components 215 of the guide rails 214, and the sliding blocks 222 is located at the starting position of the respective guide rails 214. When the display screen 400 is in the expanded state, the cooperation state of the first housing 210 and the second housing 220 is the corresponding expanded state, that is, the sliding blocks 222 at the top and bottom of the first housing cavity 310 are respectively snapped into the second limiting components 216 of the guide rails 214, and the sliding blocks 222 is located at the ending position of the respective guide rails 214. When the sliding blocks 222 are located at the ending positions of the guide rails, the second housing 220 is located at an extreme position of movement of the second housing 220 away from the first housing 210. In other words, when located at the extreme position, the second housing 220 cannot move away from the first housing 210 any more. When the display screen 400 is in the partially expanded state, the cooperation state of the first housing 210 and the second housing 220 is the corresponding partially expanded state, that is, each of the sliding blocks 222 at the top and bottom of the first housing cavity 310 is located at a position between the first limiting component 215 and the second limiting component 216 of the corresponding guide rail 214, and each of the sliding blocks 222 is located at a middle position of the corresponding guide rail 214. In the illustrated embodiments of the disclosure, the electronic device 1000 is provided with the first housing 210 and the second housing 220, and the guide rails 214 with the limiting components are disposed on the first housing 210, the sliding blocks 222 are disposed on the second housing 220, so as to enable the cooperation state of the first housing 210 and the second housing 220 to be switched between the accommodated state, the partially expanded state, and the expanded state, so that the display screen 400 can be switched between the accommodated state, the partially expanded state, and the expanded state to realize the function of drawing the display screen 400 into or out of the housing 200.

Referring to FIG. 1, in some embodiments, the first lens component 30 and the reflective element 10 may be disposed in the first housing 210. The image sensor 90 may be accommodated in the second housing 210 and fixed relative to the second housing 220, and the image sensor 90 moves synchronously with the display screen 400 as the display screen 400 is drawn out of the housing 200. That is, the first lens component 30 and the reflective element 10 are fixed relative to the first housing 210, and the image sensor 90 is fixed relative to the second housing 220 and the second end of the display screen 400. When the second housing 220 is expanded relative to the first housing 210, the second housing 220 drives the second end of the display screen 400 and the image sensor 90 to move together along the direction in which the display screen 400 is drawn out, that is, the x direction illustrated in FIG. 1. The reflective element 10 and the first lens component 30 are arranged in the first housing 210, and the first housing 210 may have a larger accommodation cavity than the second housing 220, which is conducive to accommodating the first lens component 30 which has a long length in a direction of the optical axis.

In some other embodiments, the image sensor 90 may be disposed in the first housing 210. The first lens component 30 and the reflective element 10 may be accommodated in the second housing 220 and fixed relative to the second housing 220, and the first lens component 30 and the reflective element 10 are configured to move synchronously with the display screen 400 being drawn into or out of the housing. In other words, the image sensor 90 is fixed relative to the first housing 210, and the first lens component 30 and the reflective element 10 are fixed relative to the second housing 220 and the second end of the display screen 400. When the second housing 220 is expanded relative to the first housing 210, the second housing 220 is configured to drive the second end of the display screen 400, the first lens component 30 and the reflective element 10 to move together along the direction in which the display screen 400 is drawn out. The image sensor 90 is arranged in the first housing 210, and the first housing 210 may have a larger accommodation cavity relative to the second housing 220. By arranging the mainboard of the electronic device 1000 in the first accommodation cavity of the first housing 210, a transmission distance of transmitting image data from the image sensor 90 to the mainboard can be reduced, a transmission speed can be increased, and transmission stability can be improved, which is beneficial for increasing a processing speed of the electronic device 1000 and improving quality of a final image obtained by the electronic device 1000.

The camera module 100 may be disposed below the display screen 400, and the light entrance of the camera module 100 may be arranged to face the display screen 400 or face away from the display screen 400.

Figure 2:
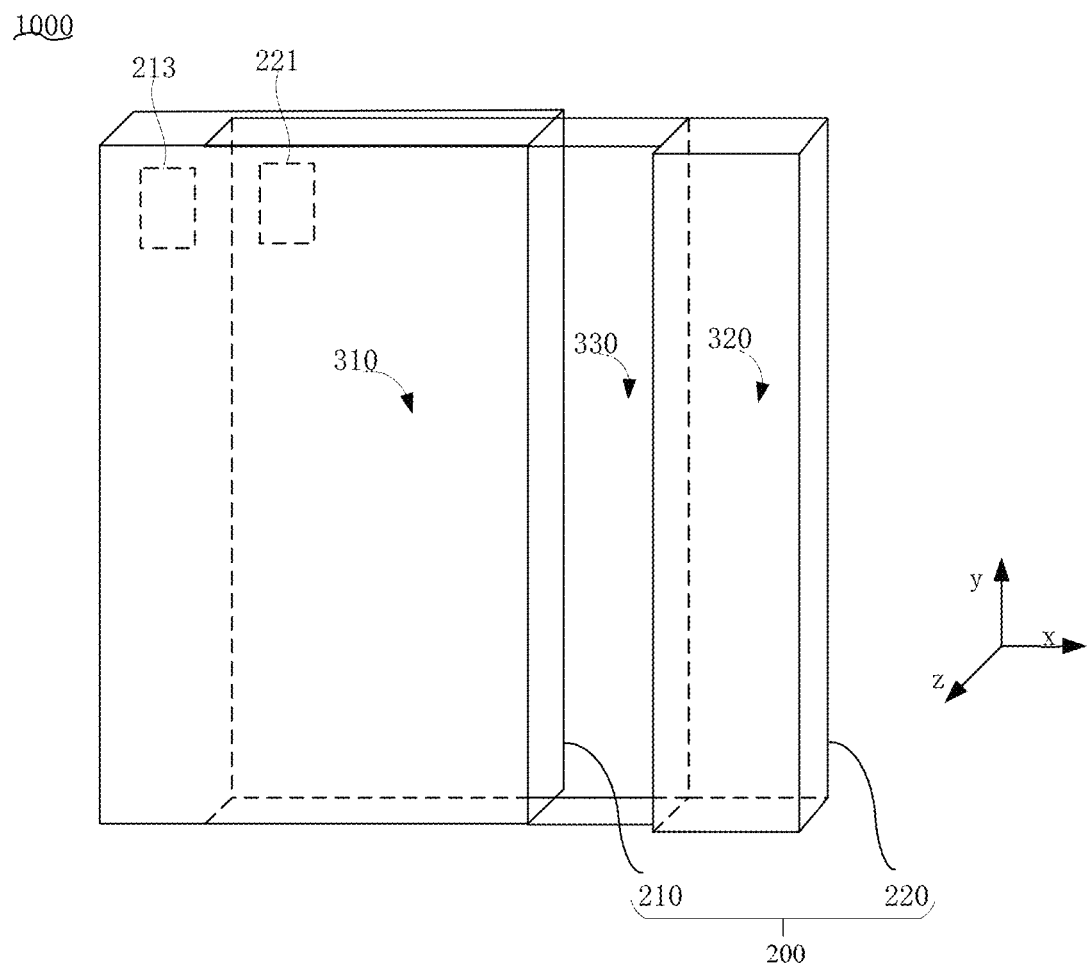
FIG. 2 is a schematic structural diagram illustrating a housing of an electronic device according to an embodiment of the disclosure.
Figure 3:
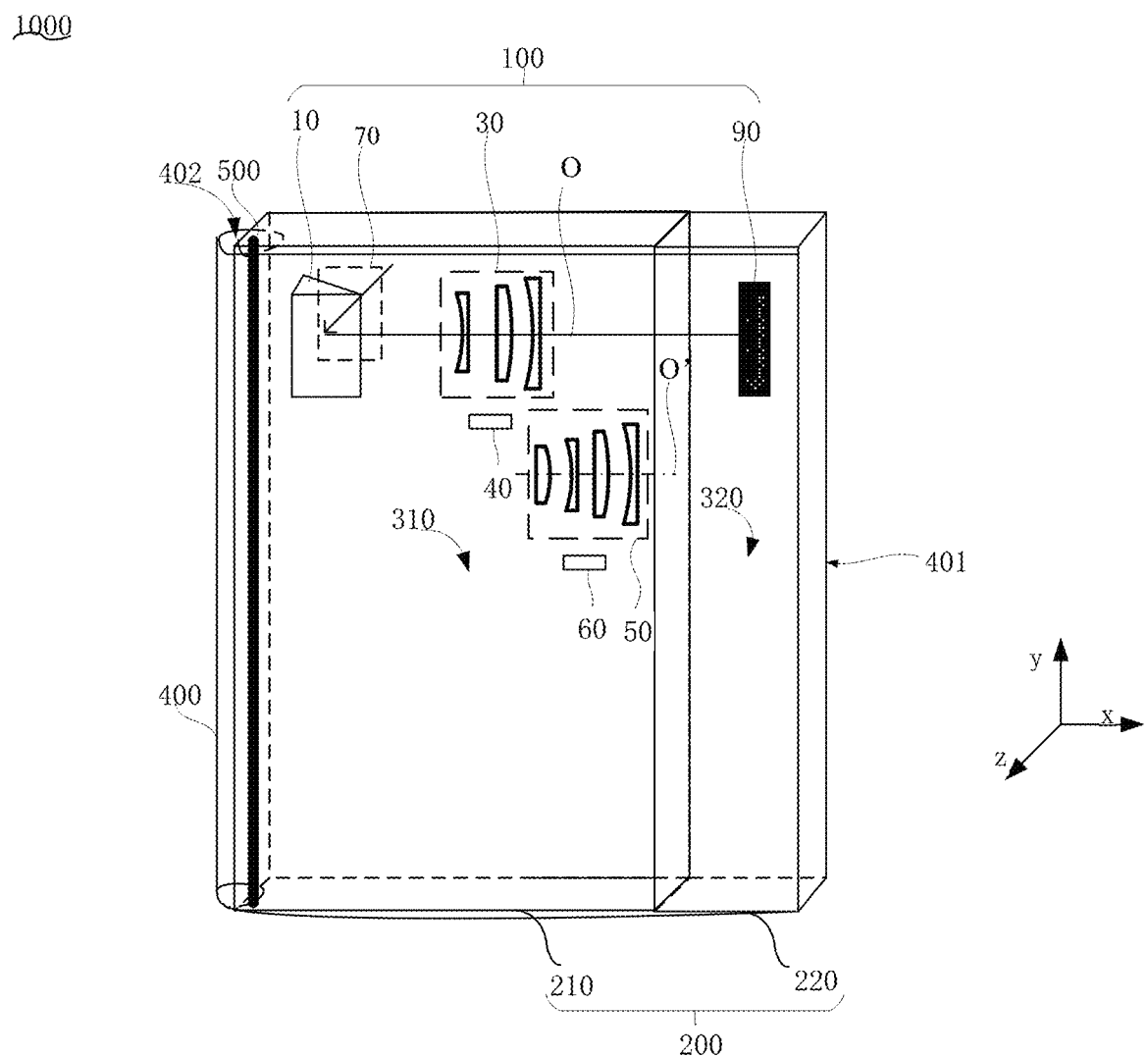
FIG. 3 is a schematic structural diagram illustrating the electronic device according to the embodiment of the disclosure.

In some embodiments, referring to FIG. 2 and FIG. 3, the light entrance 70 of the camera module 100 is arranged to face away from the display screen 400. A position of the rear surface (hereinafter referred to as the surface opposite to the display screen 400) of the first housing 210 corresponding to the light entrance of the camera module 100 is provided with a first opening 213, and a position of the rear surface (hereinafter referred to as the surface opposite to the display screen 400) of the second housing 220 corresponding to the light entrance of the camera module 100 is provided with a second opening 221. When the first housing 210 and the second housing 220 are in the accommodated state, the first opening 213 coincides with the second opening 221, as illustrated in FIG. 3. That is, when the display screen 400 in the accommodated state, the light may pass through the first opening 213 and the second opening 221 to reach the reflective element 10; when the display screen 400 in the expanded state, the first opening 213 and the second opening 221 are separated, and the light may pass through the first opening 213 to reach the reflective element 10. In this case, the camera module 100 is used as a rear camera of the electronic device 1000.

Figure 4:
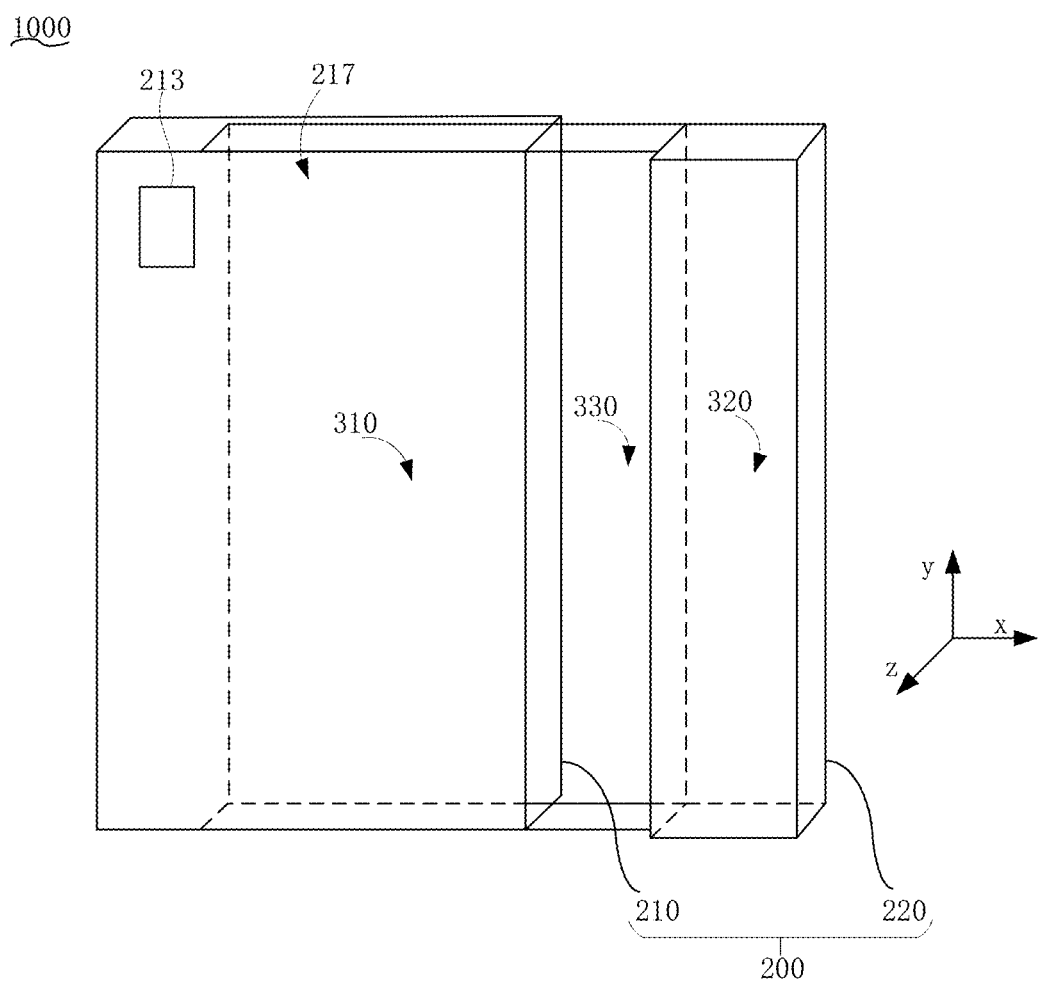
FIG. 4 is a schematic structural diagram illustrating a housing of an electronic device according to another embodiment of the disclosure.
Figure 5:
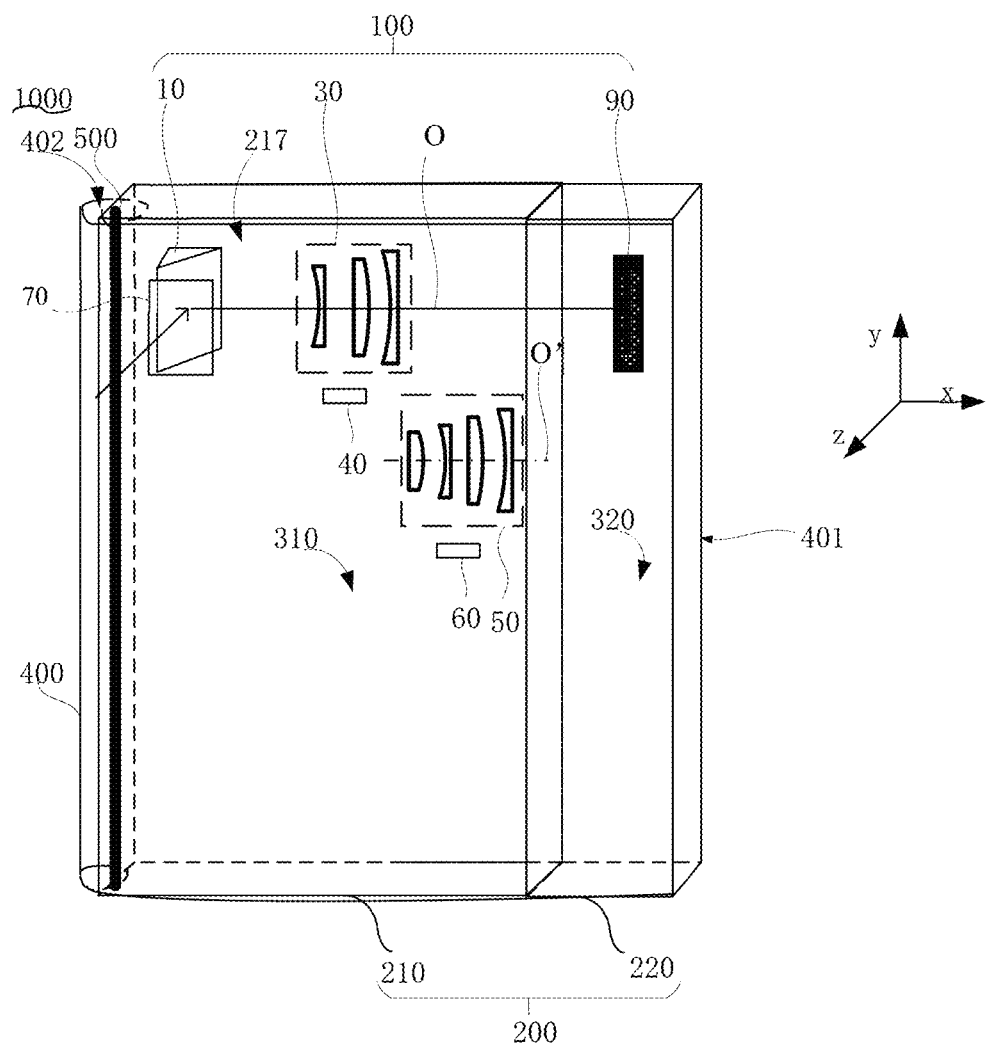
FIG. 5 is a schematic structural diagram illustrating the electronic device according to the another embodiment of the disclosure.
Figure 6:
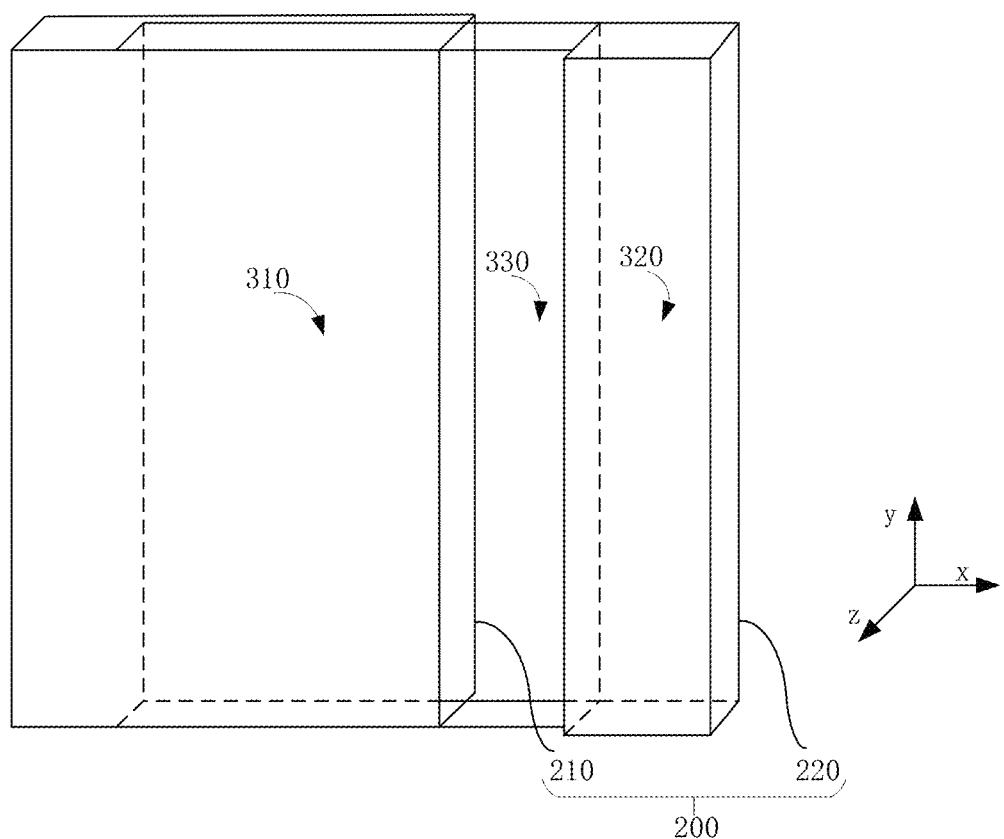
FIG. 6 is a schematic structural diagram illustrating a housing of an electronic device according to a still another embodiment of the disclosure.

In some embodiments, referring to FIG. 4 and FIG. 5, the light entrance 70 of the camera module 100 is arranged to face the display screen 400. A position of the upper surface (hereinafter referred to as the front surface, i.e., the surface facing a z direction in FIG. 4 and FIG. 5) of the first housing 210 corresponding to the light entrance of the camera module 100 is provided with a first opening 213. In this way, the camera module 100 is used as a front camera of the electronic device 1000.

In some embodiments, referring to FIGS. 6 to 9, the light entrance of the camera module 100 is arranged to face the display screen 400. Ambient light travels through the display screen 400 to reach the camera module 100 for imaging. In this case, the camera module 100 is used as an under-screen front camera of the electronic device 1000.

In some embodiments, the display screen 400 may be switched between the expanded state and the accommodated state, and the camera module 100 may be switched between the first mode and the second mode correspondingly. The camera module 100 corresponds to the first mode when the display screen 400 is in the accommodated state; the camera module 100 corresponds to the second mode when the display screen 400 is in the expanded state. Specifically, the first mode may include the short focal length mode. With respect to the short focal length mode, the camera module 100 has a short focal length, while a distance between the first lens component 30 and the image sensor 90 is short. The second mode may include the long focal length mode. With respect to the long focal length mode, the camera module 100 has a long focal length, while a distance between the first lens component 30 and the image sensor 90 is long. Due to the distance between the first lens component 30 and the image sensor 90 in the short focal length mode is relatively short, it is helpful for length matching between the camera module 100 in the short focal length mode and the housing in the accommodated state; due to the distance between the first lens component 30 and the image sensor 90 in the long focal length mode is relatively long, it is helpful for length matching between the camera module 100 in the long focal length mode and the housing in the expanded state. In the illustrated embodiments of the disclosure, the camera module 100 may be in the short focal length mode when the electronic device 1000 is in the accommodated state, and the camera module 100 may be in the long focal length mode when the electronic device 1000 is in the expanded state. In this way, the length in the lateral direction (i.e., the x direction) of the housing 200 of the electronic device 1000 in the accommodated state or the expanded state may be well matched with the distance between the first lens component 30 and the image sensor 90, so as to realize the accommodation and the expansion of the display screen 400 and the housing 200 of the electronic device 1000, as well as enabling the camera module 100 to be switched between the long focal length and the short focal length.

In addition, in the illustrated embodiments of disclosure, the electronic device 1000 is configured with the display screen 400 and the housing 200 that may be switched between the accommodated state and the expanded state, so that the lateral length of the housing 200 may be switched according to the requirements of specific usage scenarios, which is conductive for the miniaturization of the product. Meanwhile, the display screen 400 and the housing 200 may be expanded in response to requiring a long focal length camera, thereby increasing the lateral length of the electronic device 1000 and enabling the electronic device 1000 to accommodate the long focal length camera and the sensor arranged in the long focal length mode. Furthermore, the electronic device 1000 may be switched to the accommodated state for portability.

Figure 8:
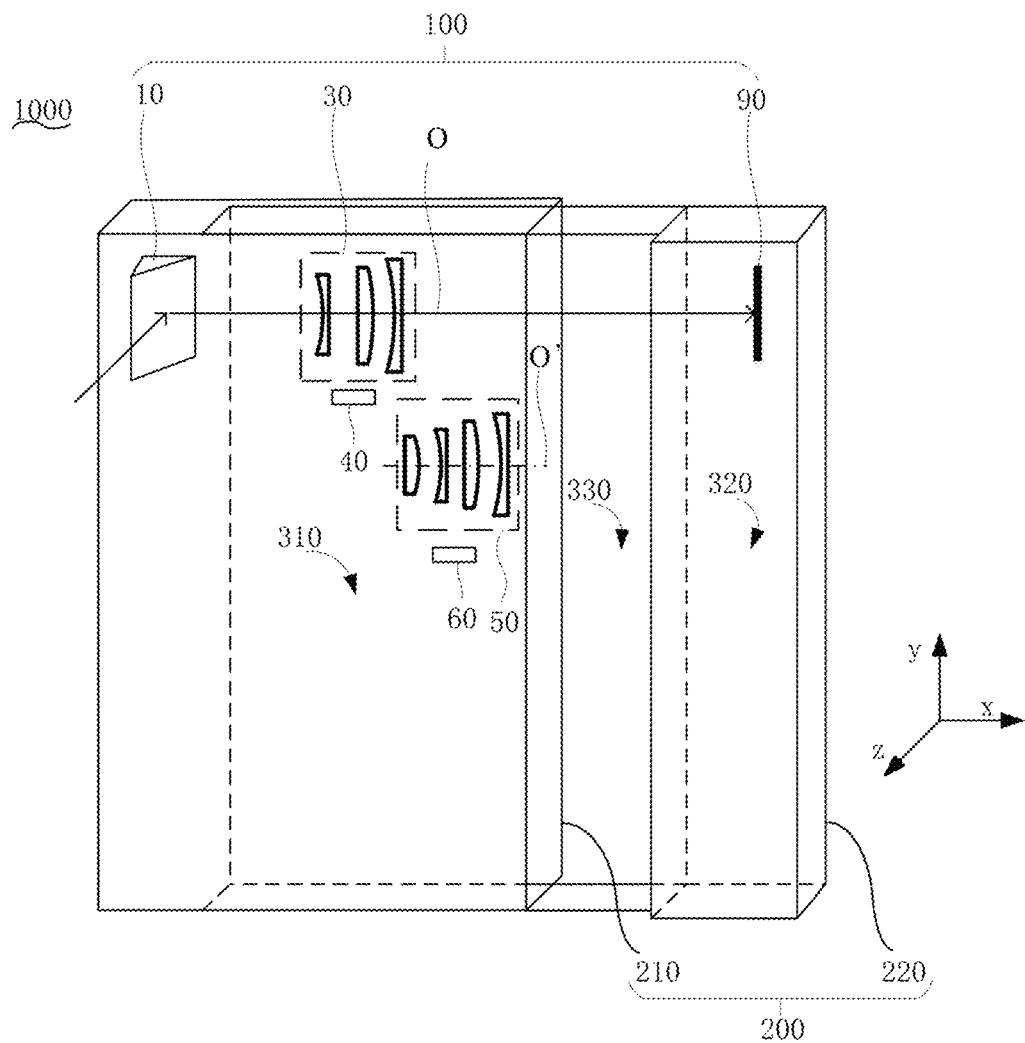
FIG. 8 is a schematic structural diagram illustrating the electronic device in a partially expanded state according to the still another embodiment of the disclosure.
Figure 9:
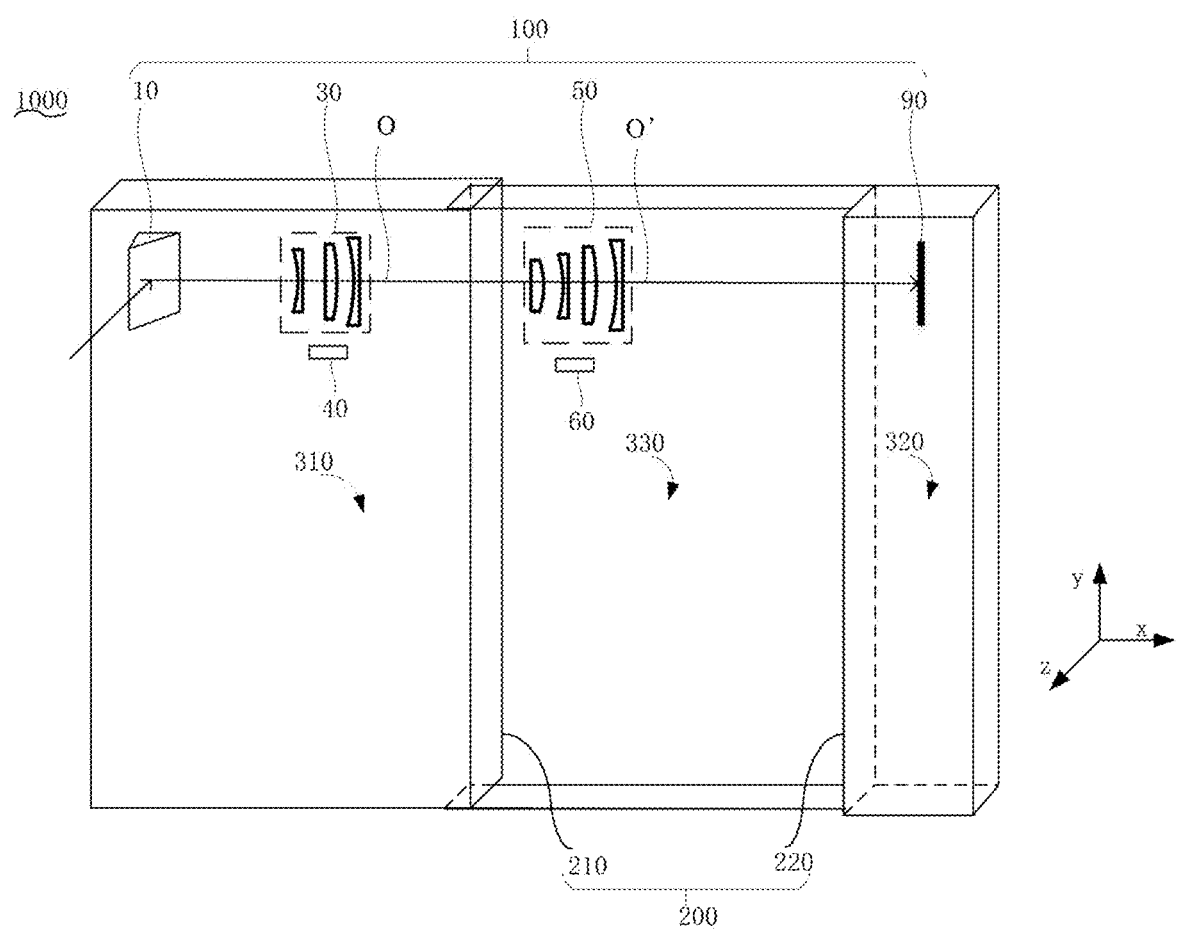
FIG. 9 is a schematic structural diagram illustrating the electronic device in an expanded state according to the still another embodiment of the disclosure.

Referring to FIGS. 7 to 9, in some embodiments, when the display screen is in the accommodated state as illustrated in FIG. 7, there is the first distance between the first lens component 30 and the image sensor 90, while the camera module 100 is in the short focal length state of the first mode (also referred to as the short focal length mode). When the display screen 400 is in the expanded state, as illustrated in FIG. 9, there is the second distance between the first lens component 30 and the image sensor 90, the second distance is greater than the first distance, while the camera module 100 is in the long focal length state of the second mode (also referred to as the long focal length mode).

In some embodiments, as illustrated in FIG. 8, when the display screen 400 is partially expanded, i.e., the display screen 400 is in the partially expanded state, the distance between the first lens component 30 and the image sensor 90 is greater than the first distance and less than the second distance. The light is reflected by the reflective element 10 to travel through the first lens component 30 to thereby reach the image sensor 90 for imaging.

In some embodiments, referring to FIGS. 7 to 9, the first lens component 30 has the first optical axis O, and the second lens component 50 has the second optical axis O'. When the display screen is in the accommodated state, as illustrated in FIG. 7, the first optical axis O and the second optical axis O' are parallel and separated from each other, the second lens component 50 is located outside of the optical path between the first lens component 30 and the image sensor 90, and the camera module 100 is in the short focal length mode. When the display screen is in the expanded state, as illustrated in FIG. 9, the first optical axis O coincides with the second optical axis O', the second lens component 50 is located in the optical path between the first lens component 30 and the image sensor 90, and the camera module 100 is in the long focal length mode. Specifically, the first optical axis O may be in the same direction as the display screen 400 is drawn out. In some embodiments corresponding to FIGS. 7 to 9, the direction in which the display screen 400 is drawn into or out of the housing 200 and the direction of the first optical axis O may be the lateral direction (also referred to as the width direction) of the electronic device 1000, i.e., the x direction illustrated in FIGS. 7 to 9. In some other embodiments, the direction in which the display screen 400 is drawn into and out of the housing 200 and the direction of the first optical axis O may be the vertical direction of the electronic device 1000, i.e., they direction illustrated in FIGS. 7 to 9.

In some embodiments, referring to FIGS. 7 to 9, during the switching of the display screen 400 from the accommodated state to the expanded state, the image sensor 90 is configured to move synchronously with the display screen 400 as the display screen 400 being drawn out of the housing 200.

In some embodiments, the second lens component 50 is configured to move towards a position between the first lens component 30 and the image sensor 90, in response to a distance between the first lens component 30 and the image sensor 90 being greater than a preset threshold. When the distance between the first lens component 30 and the image sensor 90 is a predetermined threshold, a space defined by the first lens component 30 and the image sensor 90 is exactly enough for accommodating the second lens component 50. That is, in response to the space defined by the first lens component 30 and the image sensor 90 being exactly enough for accommodating the second lens component 50, the second lens component 50 is configured to move towards a position between the first lens component 30 and the image sensor 90, thereby preventing the component from being damaged by collision during the movement.

In some other embodiments, the second lens component 50 is configured to move towards a position between the first lens component 30 and the image sensor 90, in response to the display screen 400 being drawn out. As such, the time required to switch from the short focal length to the long focal length may be reduced, the shooting speed is increased, and the user experience is improved.

When the display screen 400 and the housing 200 are in the accommodated state, the second lens component 50 may be accommodated in the first accommodation cavity 310 of the first housing 210, or be accommodated in the second accommodation cavity 320 of the second housing 220.

In some embodiments, the second lens component 50 may be configured to move towards the position between the first lens component 30 and the image sensor 90 by performing two translations. Specially, the second lens component 50 is configured to firstly translate a distance along the second optical axis O' to move away from the first lens component 30, and then translate a distance towards a direction approaching to the first optical axis O. As illustrated in FIG. 7 and FIG. 9, the second lens component 50 in FIG. 7 may be configured to firstly translate a distance towards the x direction, and then translate a distance towards the y direction, i.e., the direction approaching to the first optical axis O, thereby reaching the position of the second lens component 50 illustrated in FIG. 9.

In some other embodiments, the movement in which the second lens component 50 moves towards the position between the first lens component 30 and the image sensor 90 may include a rotation. For example, the second lens component 50 at the position illustrated in FIG. 10 may be configured to be rotated counterclockwise around a fixed point P by 90° to thereby enable the second optical axis O' to coincide with the first optical axis O after the rotation. The fixed point P may locate on the first optical axis O. After the rotation, the second lens component 50 may be further configured to translate a distance towards the first lens component 30 or the image sensor 90. In the illustrated embodiments of the disclosure, by rotating the second lens component 50, the second optical axis O' of the second lens component 50 is enabled to coincide with the first optical axis O of the first lens component 30, so that the second lens component 50 can cooperates with the first lens component 30 for imaging.

In some embodiments, the electronic device 1000 further includes the first focal length adjusting component 40 and the second focal length adjusting component 60. Specifically, the first focal length adjusting component 40 is connected with the first lens component 30 and configured to adjust the focal length and the position of the first lens component 30, so as to enable the light traveling through the first lens component 30 to be focused on the image sensor 90 in the first mode. Alternatively, the second focal length adjusting component 60 is connected with the second lens component 50 and configured to adjust the focal length and the position of the second lens component 50, so as to enable the light to travel through the first lens component 30 and the second lens component 50 to be focused on the image sensor 90 in the second mode. Still alternatively, the first focal length adjusting component 40 is connected with the first lens component 30, and the first focal length adjusting component 40 is configured to adjust the focal length and the position of the first lens component 30 to thereby enable the light traveling through the first lens component 30 to be focused on the image sensor 90 in the first mode; and the second focal length adjusting component 60 is connected with the second lens component 50, and the second focal length adjusting component 60 is configured to adjust a focal length and the position of the second lens component 50 to thereby enable the light traveling through the first lens component 30 and the second lens component 50 to be focused on the image sensor 90 in the second mode. Yet alternatively, the first focal length adjusting component 40 is connected with the first lens component 30 and is configured to adjust a focal length of the first lens component 30, the second focal length adjusting component 60 is connected with the second lens component 50 and is configured to adjust a focal length of the second lens component 50, so as to enable the light traveling through the first lens component 30 and the second lens component 50 to be focused on the image sensor 90 for imaging when the camera module 100 is in other states.

When the display screen 400 and the housing 200 are in the accommodated state, there is the first distance between the first lens component 30 and the image sensor 90, while the camera module 100 is in the first mode. In addition, when the camera module 100 is in the short focal length state, the first focal length adjusting component 40 may be connected with the first lens component 30 and configured to adjust the focal length and the position of the first lens component 30, thereby enabling the camera module 100 in the short focal length state to focus the light traveling through the first lens component 30 on the image sensor 90 for imaging.

When the display screen 400 and the housing 200 are in the expanded state, there is the second distance between the first lens component 30 and the image sensor 90, while the camera module 100 is in the second mode. In addition, when the camera module 100 is in the long focal length state, the first focal length adjusting component 40 may be connected with the first lens component 30 and configured to adjust the focal length and the position of the first lens component 30, the second focal length adjusting component 60 may be connected with the second lens component 50 and configured to adjust the focal length and the position of the second focal length adjusting component 50 to thereby enable the camera module 100 in the long focal length state to focus the light traveling through the first lens component 30 and the second lens component 50 on the image sensor 90 for imaging.

When the display screen 400 and the housing 200 are expanded partially, that is, when the display screen 400 and the housing 200 are in the partially expanded state, the distance between the first lens component 30 and the image sensor 90 is greater than the first distance and less than the second distance. In this case, the camera module 100 is in a third mode where the camera module 100 may be in a zoom state. The first focal length adjusting component 40 may be connected with the first lens component 30 and configured to adjust the focal length and the position of the first lens component 30, the second focal length adjusting component 60 may be connected with the second lens component 50 and configured to adjust the focal length and position of the second lens component 50, so as to enable the camera module 100 in the zoom state of the third mode to focus the light traveling through the first lens component 30 and the second lens component 50 on the image sensor 90 for imaging.

Specifically, the focal length adjusting component may be implemented as the electrostatic actuator component, the electromagnetic actuator component, the magnetostrictive actuator component, the piezoelectric actuator component, the piezoelectric motor, the stepping motor, or the electroactive polymer actuator motor. By providing the focal length adjustment component in the illustrated embodiments of the disclosure, the display screen 400 and the housing 200 are enabled to be in different states. In addition, the focal length adjustment component may be configured to adjust the focal length and the position of the lens component to focus the light traveling through the lens component on the image sensor 90 for imaging when there are different distances between the first lens component 30 and the image sensor 90.

In some embodiments, the first lens component 30 may include one or more lens groups, the second lens component 50 may include one or more lens groups. Each lens group of the one or more lens groups includes one or more lenses. In the above specification of the disclosure, it is described by taking the first lens component 30 including one lens group and the second lens component 50 including one lens group as an example. It can be understood that, corresponding embodiments may be implemented in a similar manner in any of the cases where the first lens component 30 includes multiple lens groups, the second lens component includes multiple lens groups, or both the first lens component 30 and the second lens component 50 include multiple lens groups.

In some embodiments, the second lens component 50 may include multiple lens groups, and the multiple lens groups may be movable to a position between the first lens component 30 and the image sensor 90 asynchronously or simultaneously. Specifically, the second lens component 50 may include a first lens group 51 and a second lens group 52. Alternatively, the second lens component 50 may include the first lens group 51, the second lens group 52 and a third lens group. Still alternatively, the second lens component 50 may include the first lens group 51, the second lens group 52, the third lens group, and a fourth lens group. The quantity of the lens groups in the second lens component 50 is not limited to the illustrated embodiments of the disclosure. It is illustrated as follows by taking the second lens component 50 including the first lens group 51 and the second lens group 52 as an example.

Figure 10:
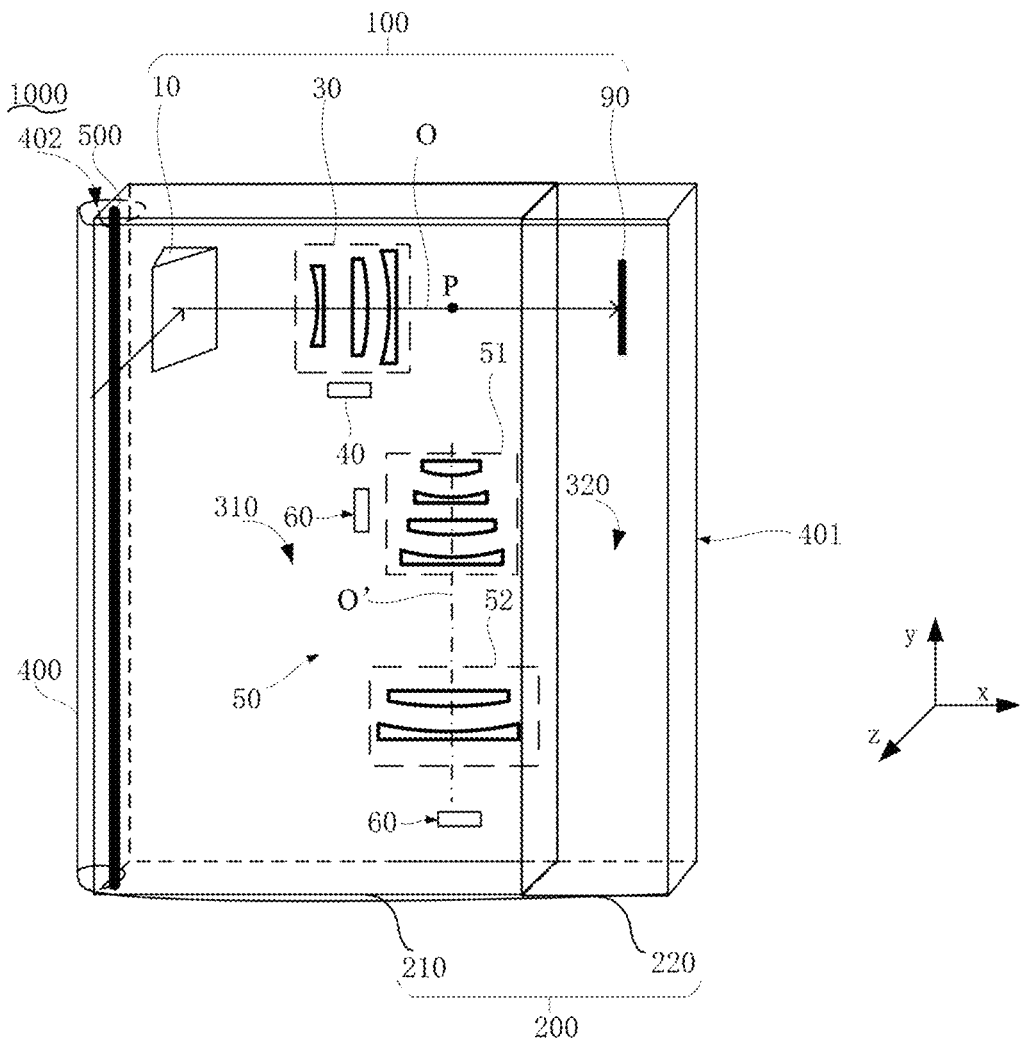
FIG. 10 is a schematic structural diagram illustrating an electronic device in an accommodated state according to a still yet another embodiment of the disclosure.
Figure 11:
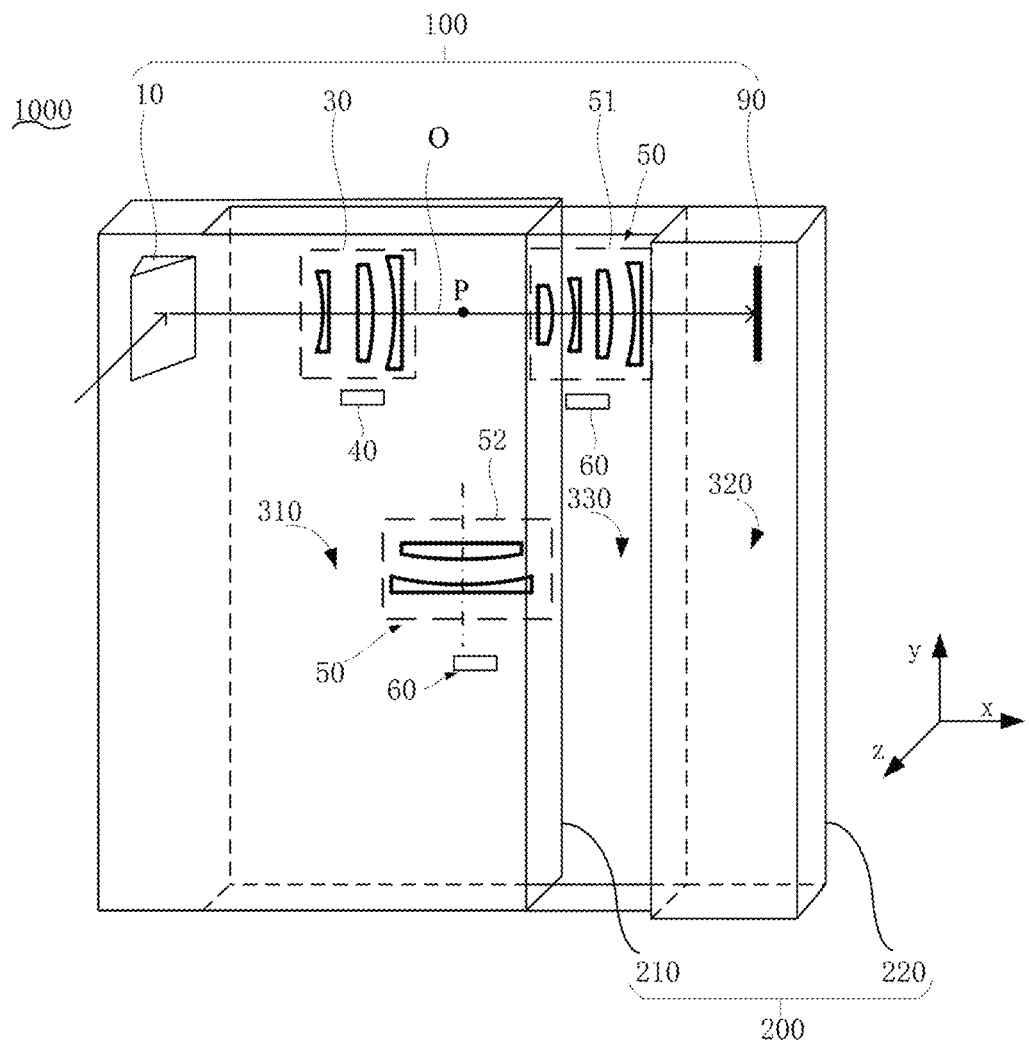
FIG. 11 is a schematic structural diagram illustrating the electronic device in a partially expanded state according to the still yet another embodiment of the disclosure.
Figure 12:
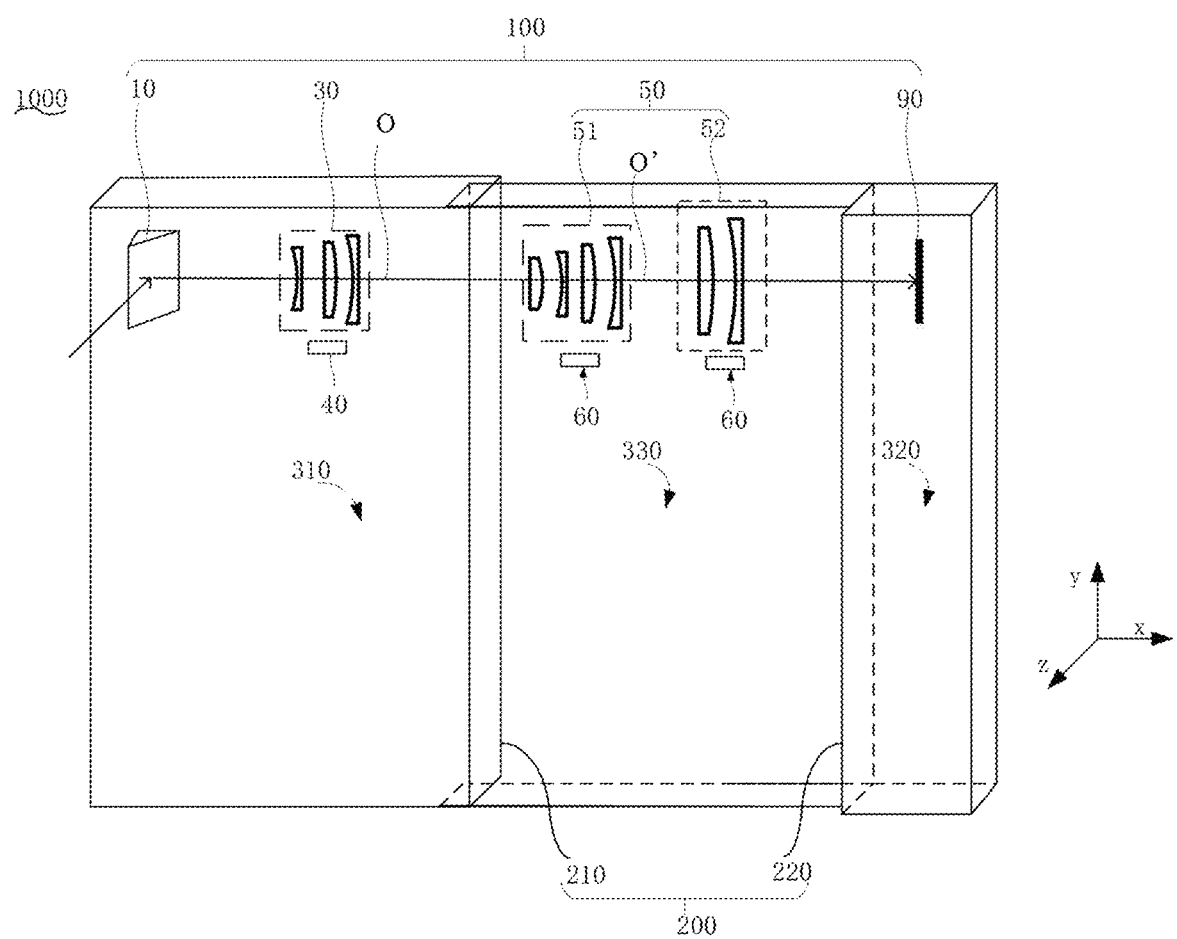
FIG. 12 is a schematic structural diagram illustrating the electronic device in an expanded state according to the still yet another embodiment of the disclosure.

Referring to FIGS. 10, 11 and 12, the second lens component may include the first lens group 51 and the second lens group 52. As illustrated in FIG. 10, when the display screen 400 and the housing 200 are in the accommodated state, the first lens component 51 and the second lens component 52 locate in the first accommodation cavity 310 with the first optical axis O not being coincided with the second optical axis O'. As illustrated in FIG. 11, when the display screen 400 and the housing 200 are in the partially expanded state and the distance between the first lens component 30 and the image sensor 90 is enough to accommodate the first lens group 51, the first lens group 51 first is configured to be rotated and translated to thereby move into the third accommodation cavity 330, so as to arrange the first lens group 51 on the first optical axis O. In addition, after the positions and focal lengths of the first lens group 30 and the first lens group 51 are adjusted by the first focal length adjusting component 40 and the second focal length adjusting component 60, the first lens component 30 and the first lens group 51 can cooperate to converge the light at the image sensor 90 for imaging. As illustrated in FIG. 12, when the display screen 400 and the housing 200 are in the expanded state, or the distance between the first lens group 51 and the image sensor 90 is enough to accommodate the second lens group 52, on the basis of FIG. 11, the second lens group 52 is configured to move into the third accommodation cavity 330 by rotating and translating, so as to enable the second lens group 52 to be also located on the first optical axis O with the second optical axis O' being coincided with the first optical axis O. In addition, after the positions and focal lengths of the first lens component 30, the first lens group 51, and the second lens group 52 are adjusted by the first focal length adjusting component 40 and the second focal length adjusting component 60, the first lens component 30, the first lens group 51, and the second lens group 52 can be configured to cooperate to converge the light at the image sensor 90 for imaging. In some other embodiments, when the display screen is pulled out of or into the housing 200, the first lens group 51 and the second lens group 52 may be configured to be rotated and translated to move into the third accommodation cavity 330 simultaneously, thereby enabling both of the first lens group 51 and the second lens group 52 to be located on the first optical lens O, that is, the second optical axis O' is coincided with the first optical axis O. In addition, after the positions and focal lengths of the first lens component 30, the first lens group 51, and the second lens group 52 are adjusted by the first focal length adjusting component 40 and the second focal length adjusting component 60, the first lens component 30, the first lens group 51, and the second lens group 52 can cooperate to converge the light into the image sensor 90 for imaging.

In some embodiments, referring to FIG. 1, the electronic device 1000 further includes a force sensor mounted on the first housing 210 and the second housing 220, a reel motor (not illustrated in the drawings) that works in cooperation with the reel 500, and a driver (not illustrated in the drawings) that may drive the moving of the sliding block 222 at the top and bottom of the second housing 220. When a drawing force in the direction of pulling out the display screen 400, i.e., the x direction, sensed by the force sensor is greater than a preset value, the reel motor may be configured to drive the reel 500 to rotate to release the display screen 400, so that the display screen 400 is enabled to be expanded out of the housing 200, and the second end of the display screen 400 is configured to move towards the x direction. At the same time, the driver drives the sliding blocks 222 are configured to move to thereby drive the second housing 220 to move along the x direction to reach a preset position. In this way, both of the display screen 400 and the housing 200 can be enabled to be expanded at the same time. When a drawing force in a direction opposite to the direction of drawing out the display screen 400, i.e., a direction opposite to the x direction, sensed by the force sensor is greater than a preset value, the reel motor may be configured to drive the reel 500 to rotate to accommodate the display screen 400 in the housing and to wind the display screen 400 around the reel 500, and the second end of the display screen 400 is configured to move towards the direction opposite to the x direction. At the same time, the driver is configured to drive the sliding blocks 222 to move to thereby drive the second housing 220 to move, along the direction opposite to x direction, to reach a preset position. In this way, both of the display screen 400 and the housing 200 can be enabled to be accommodated at the same time.

In some embodiments, as illustrated in FIG. 1, the electronic device 1000 includes the reel 500, the display screen 400, the camera module 100, the first housing 210 and the second housing 220. The second housing 220 is capable of moving relative to the first housing. The reel 500 is arranged to the first housing 210. The display screen 400 includes a first end connected to the reel 500 and a second end connected to the second housing 220. The reflective element 10 and the first lens component 30 are fixedly disposed in one of the first housing 210 and the second housing 220, the image sensor 90 are fixedly disposed in the other one of the first housing 210 and the second housing 220, and the second lens component 50 is configured to move to a position between the first lens component 30 and the image sensor 90 when the first housing 210 and the second housing 220 move away from each other. The image sensor 90 is configured to image based on light reflected by the reflective element 10 to travel through the first lens component 30 when the camera module 100 is working in a first mode. The image sensor 90 is configured to image based on light reflected by the reflective element 10 to travel through the first lens component 30 and the second housing 220 when the camera module 100 is working in a second mode.

In summary, in the illustrated embodiments of the disclosure, the electronic device 1000 is provided with the display screen 400 that is combined with the housing 200 and may be pulled into or out of the housing 200, and the camera module 100 accommodated in the housing 200, so as to enable the user to switch the state of the display screen 400 according to the use scene when using the electronic device 1000. In addition, the camera module 100 includes the reflective element 10 and the lens component which may be alternatively adjusted to be in the first operating mode or the second operating mode, so that the electronic device 1000 can be optionally enabled with the display screen 400 having the large area in the expanded state and the display screen 400 having the small area and the short lateral length in the accommodated state. In this way, the electronic device 1000 can be used in various application scenarios, it is conductive for meeting the user's diversified usage requirements for the electronic device 1000, as well as enabling the electronic device 100 with a short lateral length in the first operating mode, which is beneficial to the miniaturization of the electronic device 1000 in the accommodated state, and improves the portability of the electronic device 1000 of the disclosure.

In the description of the specification, the description with reference to the terms "one embodiment", "some embodiments", "illustrative embodiment", "example", "specific example", or "some examples", and the like, means that a specific feature, structure, material, or characteristic described in connection with the embodiment or example is included in at least one embodiment or example of the disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, without contradiction, those skilled in the art may combine different embodiments or examples and the features of the different embodiments or examples.

Although embodiments of disclosure have been illustrated and described above, it may be understood that above embodiments are just explanatory, and cannot be construed to limit the disclosure, for those skilled in the art, changes, alternatives, and modifications can be made to the embodiments without departing from the scope of the disclosure.

What is claimed is:

1. An electronic device, comprising:
   a housing;
   a display screen, wherein the display screen is combined with the housing and capable of being drawn into or out of the housing; and
   a camera module, wherein the camera module is accommodated in the housing and comprises a reflective element, a first lens component, a second lens component, and an image sensor;
   wherein the image sensor is configured to image based on light reflected by the reflective element to travel through the first lens component when the camera module is working in a first mode;
   wherein the image sensor is configured to image based on light reflected by the reflective element to travel through the first lens component and the second lens component when the camera module is working in a second mode;

wherein the display screen is capable of being switched between an expanded state and an accommodated state;

wherein the camera module corresponds to the first mode when the display screen is in the accommodated state;

wherein the camera module corresponds to the second mode when the display screen is in the expanded state.

2. The electronic device as claimed in claim 1, wherein the first mode comprises a short focal length mode, and the second mode comprises a long focal length mode.

3. The electronic device as claimed in claim 1, wherein the first lens component has a first optical axis, and the second lens component has a second optical axis;

when the display screen is in the accommodated state, the first optical axis is not coincident with the second optical axis, and the second lens component is located outside an optical path between the first lens component and the image sensor;

when the display screen is in the expanded state, the first optical axis is coincident with the second optical axis.

4. The electronic device as claimed in claim 3, wherein the first optical axis is consistent with a direction in which the display screen is drawn into or out of the housing.

5. The electronic device as claimed in claim 3, wherein there is a first distance between the first lens component and the image sensor when the display screen is in the accommodated state, there is a second distance between the first lens component and the image sensor when the display screen is in the expanded state, and the second distance is greater than the first distance.

6. The electronic device as claimed in claim 5, wherein the display screen is capable of being switched among the expanded state, the accommodated state, and a partially expanded state, when the display screen is in the partially expanded state, a distance between the first lens component and the image sensor is greater than the first distance and less than the second distance, and the image sensor is configured to image based on light reflected by the reflective element to travel through the first lens component.

7. The electronic device as claimed in claim 5, wherein the image sensor is configured to move synchronously with the display screen being drawn out of the housing, during the display screen is switched from the accommodated state to the expanded state.

8. The electronic device as claimed in claim 7, wherein the second lens component is configured to move towards a position between the first lens component and the image sensor, in response to a distance between the first lens component and the image sensor being greater than a preset threshold.

9. The electronic device as claimed in claim 7, wherein the second lens component is configured to move towards a position between the first lens component and the image sensor, in response to the display screen being drawn out of the housing.

10. The electronic device as claimed in claim 7, the electronic device further comprising at least one of a first focal length adjusting component and a second focal length adjusting component:

wherein the first focal length adjusting component is connected with the first lens component and configured to adjust a focal length of the first lens component to thereby enable the light traveling through the first lens component to be focused on the image sensor in the first mode; and wherein the second focal length adjusting component is connected with the second lens component and configured to adjust a focal length of the second lens component to thereby enable the light traveling through the first lens component and the second lens component to be focused on the image sensor in the second mode.

11. The electronic device as claimed in claim 1, wherein the housing comprises a first housing and a second housing;

the first housing comprises a first side and a second side opposite to the first side, the first side of the first housing is provided with a reel, the second housing is connected with the second side of the first housing into which the second housing is relatively movably inserted;

the display screen has a first end and a second end opposite to the first end, the first end is fixedly connected to an upper surface of the second housing, the second end is wound around the reel, and the display screen is movable along an upper surface of the first housing under driving of a movement of the second housing.

12. The electronic device as claimed in claim 11, wherein the image sensor is accommodated in the second housing and fixed relative to the second housing, the image sensor is configured to move synchronously with the display screen being drawn into or out of the housing, and the first lens component and the reflective element are disposed in the first housing and fixed relative to the first housing.

13. The electronic device as claimed in claim 11, wherein the camera module is disposed below the display screen, and a light entrance of the camera module is arranged to face the display screen or face away from the display screen;

when the light entrance of the camera module is arranged to face the display screen, a position of an upper surface of the first housing corresponding to the light entrance of the camera module is provided with a first opening; and when the light entrance of the camera module is arranged to face away from the display screen, a position of a rear surface of the first housing corresponding to the light entrance of the camera module is provided with a first opening, and a position of a rear surface of a second housing corresponding to the light entrance of the camera module is provided with a second opening.

14. The electronic device as claimed in claim 1, wherein the first lens component comprises one or more lens groups, the second lens component comprises one or more lens groups, and each lens group of the one or more lens groups comprises one or more lenses;

wherein when the second lens component comprises a plurality of lens groups, and the plurality of lens groups are capable of moving to a position between the first lens component and the image sensor asynchronously or simultaneously.

15. The electronic device as claimed in claim 14, wherein the display screen is capable of being switched among the expanded state, the accommodated state, and a partially expanded state, and the second lens component comprises a first lens group and a second lens group, each of the first lens group and the second lens group comprises one or more lenses;

when the display screen is in the partially expanded state and a distance between the first lens component and the image sensor is enough to accommodate the first lens group, the first lens group is configured to be rotated and translated so as to be arranged in a first optical axis of the first lens component, and the first lens component and the first lens group are configured to cooperate to converge the light reflected by the reflective element at the image sensor for imaging.

16. The electronic device as claimed in claim 1, wherein the housing comprises a first housing and a second housing, the first housing defines a first accommodation cavity therein, the second housing defines a second accommodation cavity therein;

both of a top and a bottom of the first accommodation cavity are provided with guide rails respectively, each of the guide rails is mounted on an inner side of the first accommodation cavity and disposed between the first housing and the second housing, both of a top and a bottom of the second housing are provided with sliding blocks respectively;

the sliding block at the top of the second housing is configured to cooperate with the guide rail at the top of the first accommodation cavity, the sliding block at the bottom of the second housing is configured to cooperate with the guide rail at the bottom of the first accommodation cavity, and thereby enabling the sliding blocks to move in the respective guide rails to drive the second housing to move away from or approach the first housing.

17. The electronic device as claimed in claim 16, wherein each of the guide rails comprises a starting position and an end position locating at two ends of the guide rail, the starting position of each of the guide rails is provided with a first limiting component, and the end position of each of the guide rails is provided with a second limiting component;

each of the sliding blocks is snapped into the first limiting component of the corresponding guide rail, when the camera module is working in the first mode;

each of the sliding blocks is snapped into the second limiting component of the corresponding guide rail, when the camera module is working in the second mode.

18. The electronic device as claimed in claim 17, wherein the image sensor is disposed in the first housing, the first lens component and the reflective element are accommodated in the second housing and fixed relative to the second housing, and the first lens component and the reflective element are configured to move synchronously with the display screen being drawn into or out of the housing.

19. An electronic device, comprising:
a housing;
a display screen, wherein the display screen is combined with the housing and capable of being drawn into or out of the housing; and
a camera module, wherein the camera module is accommodated in the housing and comprises a reflective element, a first lens component, a second lens component, and an image sensor;
wherein when the display screen is in an accommodated state, there is a first distance between the first lens component and the image sensor, and the image sensor is configured to image based on light reflected by the reflective element to travel through the first lens component;
wherein when the display screen is in an expanded state, there is a second distance between the first lens component and the image sensor, the second distance is greater than the first distance, and the image sensor is configured to image based on light reflected by the reflective element to travel through the first lens component and the second lens component.

20. An electronic device, comprising:
a first housing;
a second housing capable of moving relative to the first housing;
a reel arranged to the first housing;
a display screen, wherein the display screen comprises a first end connected to the reel and a second end connected to the second housing;
a camera module, wherein the camera module comprises a reflective element, a first lens component, a second lens component, and an image sensor; the reflective element and the first lens component are fixedly disposed in one of the first housing and the second housing, the image sensor are fixedly disposed in the other one of the first housing and the second housing, and the second lens component is configured to move to a position between the first lens component and the image sensor when the first housing and the second housing move away from each other;
wherein the image sensor is configured to image based on light reflected by the reflective element to travel through the first lens component when the camera module is working in a first mode;
wherein the image sensor is configured to image based on light reflected by the reflective element to travel through the first lens component and the second lens component when the camera module is working in a second mode.

* * * * *